April 18, 1961  A. KORGANOFF ET AL  2,980,047
SUBMARINE VESSEL EQUIPPED WITH HYDROFOIL ASSEMBLY
Filed Aug. 2, 1957  2 Sheets-Sheet 1
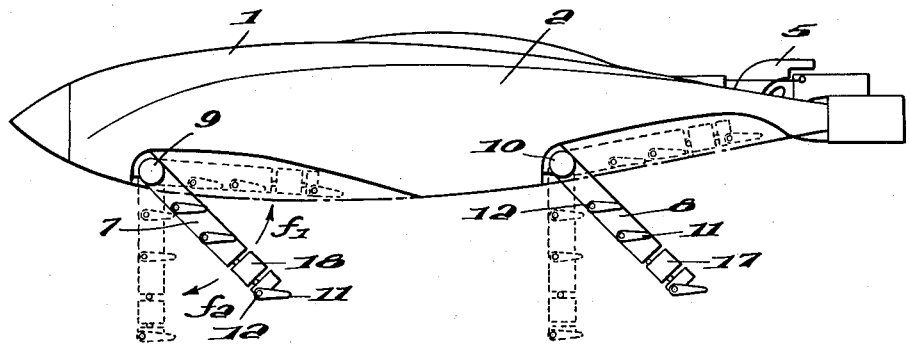
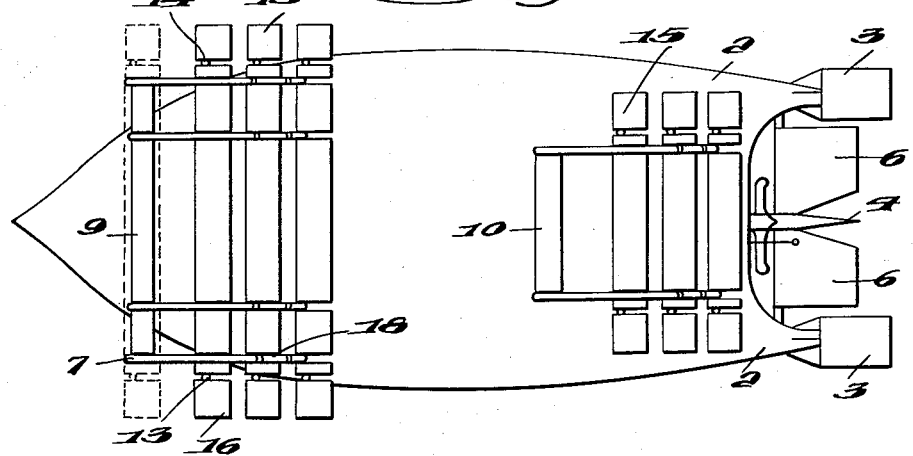
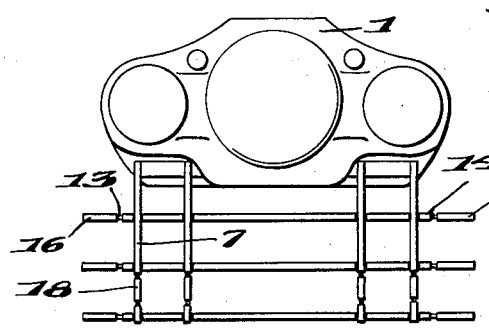
INVENTORS
ALEXANDRE KORGANOFF,
HANS HERMANN SCHLUNZ,
BY
ATTORNEYS

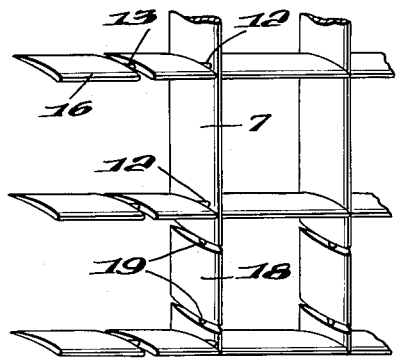
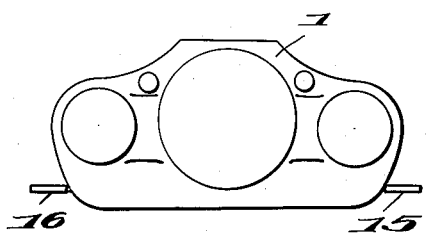
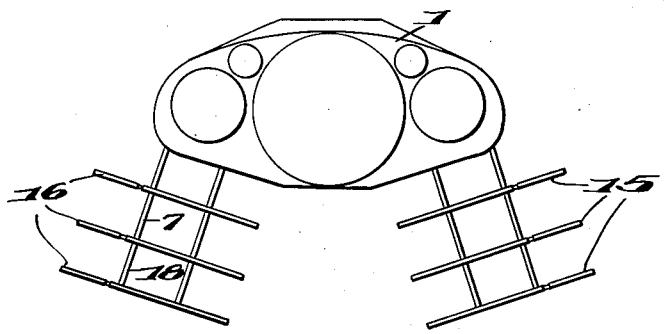
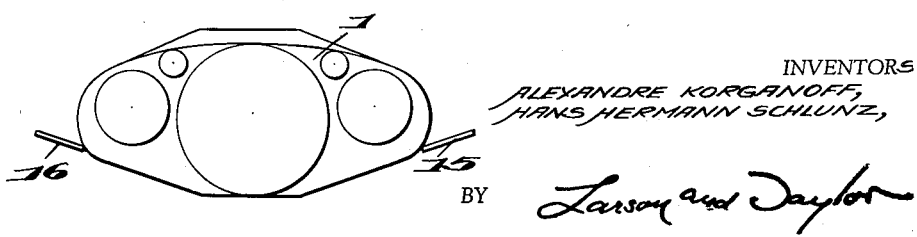

United States Patent Office 2,980,047
Patented Apr. 18, 1961

2,980,047

SUBMARINE VESSEL EQUIPPED WITH HYDROFOIL ASSEMBLY

Alexandre Korganoff, 6 Rue Castellane, Paris, France, and Hans Hermann Schlung, Konigsbergstrasse 104, Wedel, near Hamburg, Germany Filed Aug. 2, 1957, Ser. No. 676,048

2 Claims. (Cl. 114—16)

It is known that in order to reduce the resistance to the movement of small boats through the water, hydrofoils may be used which shift the hull to a position above the surface of the water, the hydrofoils acting relative to the water in the same manner that the wings of an aircraft act relative to the air. The reduction of resistance to forward movement is of the order of 70%. The amplitude of the accompanying waves is substantially reduced, and the efficiency is two to three times superior to that of hulls without hydrofoils.

The present invention has for one of its objects the application of similar devices to a submarine. The vessel acts as a normal submarine below the surface until it emerges when it may attain higher speeds when its hull is lifted above the surface of the water.

According to another characteristic of the invention, as the applied forces may be important, the hull may be lifted above the hydrofoils by means of reaction propulsion, the reactor may function well both in the water and below the surface of the water.

To permit the submarine to maintain its efficiency underwater, it is necessary to make the hydrofoils retractable, for example by stowing the hydrofoils in appropriate ventral spaces or slots in the submarine hull.

In most cases it may be preferable to install, on the under part of the ship, numerous hydrofoils; in which case they may be separated into a group of forward hydrofoils and a group of aft hydrofoils. Within each group, the individual hydrofoils are situated one above the other, with a separation distance, which, according to the invention, may be individually modified or modified for the entire group. The hydrofoils are mounted to provide for continuous control of the general angle of attack of the hydrofoil blades, and to permit the possibility of adjusting separately or in unison the spaces between the hydrofoil blades, as well as the degree of extension of each hydrofoil assembly underneath the vessel.

The assembly of transversely retractable hydrofoils so that the space between the individual hydrofoil blades may be regulated permits easier turning maneuvers and acceleration of the dive and the ascent. This adjustment also permits the regulation of the attitude of the machine to compensate for static and dynamic loads and variations of the center of gravity whether or not due to the loads carried by the vessel. This adjustment can also compensate for variations in the speed of the vessel, as well as to provide for variations in the behavior and state of the sea. The change in the adjustable angle of attack of the hydrofoils and/or the vertical spacing of each group also facilitates the dive and ascent.

One other principal object of this invention is the application of a hydrodynamic aileron herein referred to as a hydron having the dual function of facilitating the maneuver of submarines both below or on the surface of the water. The hydrons have in the water a function comparable to the ailerons of an airplane, when the angles of attack of the port and starboard hydrons vary symmetrically and in opposite directions. They facilitate turning by permitting the submarine to make a coordinated bank in the direction of the turn. A second function of the hydrons is comparable to that of the horizontal stabilizers of an airplane, when they are both tilted in parallel in the same direction for diving or ascending.

Furthermore, the simultaneous adjustment of the hydrons and the directional rudder or rudders incorporated in the submarine permits, when the said controls are synchronized, high-speed turns both under the water and on the surface, in a maneuver comparable to that of an airplane.

The invention will be better understood in conjunction with the following description relating to the attached drawings:

Fig. 1 is a lateral view of the apparatus in which the hydrofoil assemblies are partially extended and in this figure the dotted lines show the same assemblies in both retracted (stowed), and fully extended positions, Fig. 2 is a front view of the submarine, Fig. 3 is a view from below corresponding to Fig. 1, Fig. 4 shows in perspective the fitting of the components of the hydrofoil assembly, Fig. 5 shows the vessel with the hydrofoil assembly retracted, Figs. 6 and 7 show, with the hydrofoil assembly respectively extended and retracted, a modification of the embodiment shown in Figs. 1 to 5.

The vessel illustrated in Fig. 1, consists of a hull 1 in which are embedded two reaction engines 2 which, at their rear portion, transmit their thrust through two nozzle outlets 3.

The apparatus is provided with a directional stabilizer (rudder) 4 pivoted within a bracket 5, and a horizontal stabilizer (hydroplane) 6. The apparatus also carries on the lower portion two sets of uprights 7 and 8 which are pivoted at 9 and 10 to recessed points within the hull so that these uprights are securely connected to the hull.

Upon these uprights and between them are mounted hydrofoils 11 pivoting preferably from the forward portion upon the axes 12 connected to the uprights 7 and 8. It should be understood that these hydrofoils when extended can act to hold the hull 1 above the water; that is, when the apparatus is moving forward in the water with sufficient speed, the hydrodynamic forces which are applied to both the upper and lower portions of the profile of the hydrofoils 11, tend to apply lift to the hydrofoils, according to a well known phenomenon, and tend to maintain the hydrofoils in the direction of flow of the fluid so that the axes 12 give adequate support to the hull 1. The position of the axes 12 relative to the interior of the profile of the hydrofoils and the hydrofoil profile itself determine the minimum speed at which the apparatus is supported above the water.

In practice therefore, the vessel may be employed as a submarine or as a normal surface ship, and will not be lifted off the water by the hydrofoil assembly until it attains the speed essential for sustained lift.

The axes 12 are hollow so as to permit the passage of shafts 13 and 14, emerging at the extremities of hydrofoils 11, which give rigid support to the ailerons 15 and 16, herein referred to as hydrons which may be made to move together in the same direction through axes 13 and 14 (in which case their movement may be coordinated with that of the horizontal stabilizer, the hydroplane 6), or these hydrons may be made to move in opposing directions and thereby cause the vessel to pivot on its longitudinal axis. It should be noted that even when the hydrofoil assembly is retracted within the hull of the submarine, the hydrons 15 and 16 protrude along the sides of the hull and remain operable.

The specific means for pivoting the uprights 7 and 8 between retracted and extended positions and for operating the shafts 13 and 14 forms no part of the present invention and may comprise mechanisms well known in the prior art and shown, for example, in U.S. Patents 2,749,870 or 2,683,179. The means for operating the shafts 13 and 14 may be initiated, for example, from a hydraulic system having the main unit within the hull and transmitted through hydraulic lines passing through the uprights 7 and 8. These uprights may be equipped with vertical stabilizers (rudders) 17 and 18 which may be supported or controlled by shafts 19 and which may assist the directional rudder 4.

It should be noted that the rudder 4 and the hydroplane 6 may be eliminated if the hydrons 15 and 16 are controlled both in parallel (in the same direction) and in opposition (in inverse directions) and if the uprights 7 and 8 incorporate vertical stabilizers (rudders) 17 and 18.

In the position shown in Fig. 1, the two assemblies of legs 7 and 8 are obviously at the same angle of inclination. It should be noted that by readjusting the legs 7 to reduce in horizontal projection the distances between the different axes of articulation 12 so that the forward portion of the hull is less high above the water the device will cause the nose of the submarine to drop. It is thereby possible, by varying the angle of the front or rear hydrofoil assemblies, to facilitate rapid ascents or dives.

In Fig. 5, it will be noted that the hydrons may still be operated when the hydrofoil assembly is retracted, that is to say, when the vessel is acting as a submarine.

In Figs. 6 and 7 there is shown a vessel of the same type as that disclosed in Figs. 1 to 5 but equipped with two pairs of hydrofoil assemblies pointing symmetrically in an outward direction. This embodiment tends to give better stability by providing four points of support upon the water, and with a relatively wider spacing between the extreme outside points.

This invention is not limited to the configurations described and illustrated herein; but encompasses all the variants within the scope of the appended claims. One may, for example, replace the retractable legs 7 and 8 by telescopic legs, pivoting or articulated, or replace the engines 2 by a single engine connected to nozzle outlets which may be mounted directly upon the hydrofoils or stabilizers which have been described herein. In effect, one may thus direct the jet propulsion in alignment with the orientation of the stabilizer and facilitate the maneuvering of the submarine.

We claim:

1. In a submarine, a hydrofoil assembly including a pair of supports retractably mounted on the submarine, a plurality of hydrofoils mounted in spaced relation between said supports, hydrons mounted on said supports adjacent the ends of said hydrofoils, and means for moving said hydrofoil assembly between an extended position wherein both said hydrofoils and said hydrons are operative and a retracted position wherein said hydrofoils are inoperative and said hydrons are operative.

2. In a submarine according to claim 1 and further including means for pivoting said hydrons with respect to said hydrofoils.

References Cited in the file of this patent

UNITED STATES PATENTS

| | | |
|---|---|---|
| 1,024,067 | Forlanini | Apr. 23, 1912 |
| 1,112,405 | Forlanini | Sept. 29, 1914 |
| 1,410,876 | Bell et al. | Mar. 28, 1922 |
| 2,081,868 | Hampden | May 25, 1937 |
| 2,720,367 | Doolittle | Oct. 11, 1955 |
| 2,795,202 | Hook | June 11, 1957 |
| 2,856,877 | Baker | Oct. 21, 1958 |

FOREIGN PATENTS

| | | |
|---|---|---|
| 425,435 | Italy | Oct. 1, 1947 |
| 458,111 | Great Britain | Dec. 14, 1936 |
| 888,515 | Germany | Sept. 3, 1953 |